(12) United States Patent
Dattero et al.

(10) Patent No.: US 6,973,462 B2
(45) Date of Patent: Dec. 6, 2005

(54) INTEGRATED GUARDIANSHIP INFORMATION SYSTEM

(75) Inventors: Ronald Dattero, Boca Raton, FL (US); Stuart D. Galup, Fort Lauderdale, FL (US); Bryan Thabit, Boca Raton, FL (US)

(73) Assignee: Florida Atlantic University, Boca Raton, FL (US)

(*) Notice: Subject to any disclaimer, the term of this patent is extended or adjusted under 35 U.S.C. 154(b) by 582 days.

(21) Appl. No.: 10/115,535

(22) Filed: Apr. 3, 2002

(65) Prior Publication Data

US 2002/0169630 A1    Nov. 14, 2002

Related U.S. Application Data

(60) Provisional application No. 60/281,336, filed on Apr. 3, 2001.

(51) Int. Cl.[7] .......................... G06F 7/00; G06F 17/00; G06F 17/30; G06F 15/16
(52) U.S. Cl. .......................... 707/104.1; 707/6; 707/10; 709/219
(58) Field of Search .......................... 707/10, 204, 6, 707/104.1; 705/1; 709/219

(56) References Cited

U.S. PATENT DOCUMENTS

| | | | |
|---|---|---|---|
| 2001/0037224 A1 * | 11/2001 | Eldridge et al. | 705/4 |
| 2001/0047310 A1 * | 11/2001 | Russell | 705/26 |
| 2002/0002474 A1 * | 1/2002 | Michelson et al. | 705/3 |
| 2002/0091564 A1 * | 7/2002 | Geller | 705/12 |
| 2002/0120560 A1 * | 8/2002 | Morgan | 705/38 |
| 2002/0152113 A1 * | 10/2002 | Butz | 705/11 |
| 2002/0169718 A1 * | 11/2002 | Alsofrom | 705/40 |
| 2003/0041063 A1 * | 2/2003 | Brady | 707/10 |
| 2003/0112270 A1 * | 6/2003 | Newell et al. | 345/738 |

OTHER PUBLICATIONS

US Department of Health and Human Services website-http://www.acf.hhs.gov/programs/cb/dis/sacwis/index.htm, Jan. 17, 2001.*
Colorado Department of Human Services- Office of Children, Youth and Families webpage-http://web.archive.org/web/19991009013552/http://www.cdhs.state.co.us/Text/cyf/CYF_Automation/cyfhome2.html, Apr. 6, 1999.*
Statewide Public Guardianship Office, 'Guardianship Basics- A Handbook for Guardians', Jun. 2004, pp. 2-14.*

* cited by examiner

Primary Examiner—Uyen Le
Assistant Examiner—Cheryl Fernandes
(74) Attorney, Agent, or Firm—Akerman Senterfitt

(57) ABSTRACT

An integrated guardianship system. The system can include a Clerk of the Court system for processing ward data and guardianship data; a guardian background investigation system communicatively linked to the Clerk of the Court system over a computer communications network; and, at least one database for storing ward, guardianship and background data, wherein the ward, guardianship and background data can be accessed by an authorized system communicatively linked to the computer communications network. Notably, the guardian background investigation system can conduct background investigations of guardians based on guardian data electronically provided by the Clerk of the Court system over the computer communications network. The background investigations, in turn, can produce guardian background data. Finally, the guardian background investigation system can electronically provide the guardian background data to the Clerk of the Court system over the computer communications network.

18 Claims, 3 Drawing Sheets

INTEGRATED GUARDIANSHIP INFORMATION SYSTEM

CROSS REFERENCE TO RELATED APPLICATIONS

This patent application is a continuation of U.S. Provisional Patent Application Ser. No. 60/281,336 filed Apr. 3, 2001.

BACKGROUND OF THE INVENTION

1. Technical Field

This invention relates to the field of probate, guardianship and mental health information systems and more particularly to an integrated system and method for capturing and processing guardianship related data.

2. Description of the Related Art

A guardianship is generally defined as the relationship between a guardian and a ward. The guardian is the person or entity charged with the duty to take care and manage the property and rights of another person, the ward, who is considered incapable of managing their own affairs. There are several kinds of guardianship, which include guardianships of the person, property, emergency guardianships, risk; guardianships of incapacitated adults and guardianships of the property of minors. Importantly, the guardian may exercise only those rights that have been removed from the ward and delegated to the guardian.

Guardianship is a legal relationship between the guardian and ward, much like that of an agent or attorney-in-fact, that is created by order of a court with proper jurisdiction. For example, in Florida, the probate courts have exclusive jurisdiction over the appointment of guardians for minors and incapacitated adults. When an Order has been issued appointing a guardian, typically Letters of Guardianship are issued by the court to the person appointed. The Letters of Guardianship serve to evidence that the guardian has authority over the person or property (or both) of the ward.

A guardian of the person of another has those rights and powers reasonably necessary to provide adequately for the support, care, education and well-being of the ward. A guardian of the person is much like the parent of a child who has both the authority and the responsibility of making decisions for the child. A guardian of the person or property of another owes a duty of undivided loyalty to the ward and must act in the best interests of the ward and the ward's property. Guardians are required to avoid even the appearance of a conflict of interest in management of the ward's property and/or in decisions about the ward's person. Additionally, expenditures which appear to benefit another, especially the guardian, more than the ward are carefully scrutinized by the Court.

A guardian of the person is entitled to custody of the ward and may establish the ward's residence, consistent with the terms of any restrictions or directions from the Court. The guardian is required to make arrangements, from funds available from the ward's estate or other sources, to support the ward in the least restrictive environment, according to the needs and resources of the ward. Guardians of the person often are required to file with the court written reports on the ward's general condition, living circumstances, progress and development, and needs. Generally, these reports are referred to as "plans".

By comparison, a guardian of the property of another has the duty to exercise ordinary diligence in dealing with the ward's property and may be held liable for any loss resulting from a lack of such diligence. A guardian of the property has the duty to collect and preserve the assets of the ward. Except as limited by law or the court's order, a guardian of the property has control and authority over all property (real, personal and intangible) of the ward and succeeds to all property and contract rights removed from and not reserved to the ward.

All funds and property of the ward must be maintained, preserved, expended and used for the benefit of the ward and those who may be legally dependent upon the ward. The ward's estate should be utilized to feed, clothe, house, educate and care for the ward and his lawful dependents in the standard to which the ward and his dependents are accustomed, to the extent of and as may be limited by the ward's resources. Utilization of the ward's estate for his dependents should be after taking into account all other income of or support for the dependents. Utilization of the ward's estate for his own benefit should take into account all income and support of the ward and the expected duration of the guardianship. Significantly, it is the duty and responsibility of the guardian of the property to properly manage and invest the ward's estate, and all funds of the estate must be properly invested so as to earn reasonable income for the ward. Noncash assets of the ward must also be properly managed and protected for the benefit of the ward. If an asset is reasonably capable of earning income, it must be dedicated to that purpose unless there is a compelling reason otherwise. Non-income-producing assets should be preserved and protected or liquidated (after proper authority is granted), as may be appropriate under the circumstances.

A guardian of the property does not have authority to sell, convey, transfer, mortgage, pledge or give away property of the ward without an order from the court. The court may, upon the application of the guardian and after appropriate notice is given as required by law, grant the guardian such authority if the proposed transaction is considered by the court to be appropriate and proper. Generally, the assets of the ward are to be preserved for the ward's use and benefit, and sales of property of the ward are usually permitted only when necessary to provide for the care and support of the ward (and/or those dependent upon the ward) or when preservation of the asset is burdensome to the guardianship. The Court may, as appropriate, grant authority to the guardian to sell the asset at a public sale (a legal auction) or at a private sale under a specific contract.

Bank accounts should be especially clearly designated, so as to avoid unintentional commingling of funds or attachment for debts of the guardian, and the ward's Social Security number should be provided to the bank for the reporting of interest income and other matters to the Internal Revenue Service. Tangible items and personal property of the ward should be maintained and protected by the guardian and not be so commingled with personalty of the guardian as to lose its identity as the ward's property. A guardian has no authority, absent the Court's approval, to use property of the ward in such a manner as to dissipate, depreciate, waste or consume it or otherwise use it for the guardian's own benefit. A guardian of the property of another has the responsibility of filing, on behalf of the ward, all federal and state income tax returns which might be required from the ward.

To enable the court to properly track the progress of a particular guardianship, guardians of the person are required to file reports with the court which disclose the status, condition, needs and circumstances of the ward. The reports, typically referred to as "Annual Plans", inform the court where the ward is located, how the ward generally is progressing, how and whether the ward's needs have been met, and whether there has been any change in the condition or status of the ward which might warrant court intervention or a change in the guardianship order. In many jurisdictions, guardians submit an "Initial Plan" within thirty or sixty days of the date of appointment of the guardian. Thereafter, plans typically are filed annually.

In addition to an Initial Plan, guardians of the property generally also are required to file with the court an inventory of all assets in the estate of the ward. The inventory must sufficiently itemize the assets and set forth a reasonable value thereof to fully disclose of record the property of the ward over which the guardian has control or authority. Inventories are designed to disclose to the court and anyone interested in the guardianship the full value of the guardianship, which is often not known or only estimated at the time the proceedings are filed. Inventories also allow the court to determine the sufficiency of a guardianship bond posted by the guardian.

Finally, guardians of the property also are required to file an annual accounting with the court. The annual accounting provides an accounting to the court of the actions of the guardian by itemizing all receipts and expenditures associated with the guardianship. In many jurisdictions, the Court is required to audit the returns of guardians. To facilitate the court audit, guardians are required to maintain complete and accurate records of all of their actions as guardians.

The background of a guardian is a prominent factor in the audit process. The education, experience, knowledge and overall well-being of each guardian are important considerations. For instance, if a guardian lacks a basic education, the possibility of errors arising in the preparation of an initial inventory or an annual accounting can increase dramatically. Moreover, if a guardian lacks experience in managing cash or bank accounts, for example in the balancing of a check book, the possibility of errors also can be increased. Furthermore, if a guardian has not been trained or educated in the preparation process of accountings, errors too are likely to occur. Finally, if the health or well-being of a guardian is not sufficient, the guardian is more likely to create errors in the accountings.

Hence, to ensure that the guardian is able to sufficiently fulfill and execute the responsibilities of legal guardianship, guardians are required to submit to an initial and annual background investigations. Additionally, guardians are required to file certain periodic reports with the court having jurisdiction over the proceedings. These reports are intended to provide the court certain information for the court to properly supervise the affairs of the ward and to supervise and monitor the guardian's performance of the lawful duties and responsibilities.

Presently, the various jurisdictions of the United States manage the complex process of guardianship through a variety of less than ideal forms management methods. For instance, in the State of Florida, both Case Monitors and the Clerk of the Court share responsibility for managing each guardianship. More particularly, when the court determines that a guardianship is to be formed, the rudimentary case information is collected in the Clerk of the Court's office. The case information can include basic information regarding the ward, a proposed guardian, and an attorney associated with the guardian. A file jacket can be created with this information and forwarded by courier to the Court Monitor where a background investigation can be conducted for the proposed guardian. Subsequently, the file jacket can be forwarded to the Clerk of the Court's office where a guardianship plan created by the proposed guardian can be ha added to the file. Finally, audits can be periodically conducted by the Auditing Group of the Clerk of the Court's office to verify the adequacy and propriety of the guardianship.

Significantly, to date the guardianship process has not been automated because of the multiplicity of parties involved in creating and maintaining a guardianship file. Specifically, the present process involves no less than a Court Monitor, the Clerk of the Courts Office, the guardian and an Auditing Group. In addition, in some jurisdictions a Victim's Advocate can be added to the list of involved parties. Each of these groups utilizes disparate information systems which cannot be integrated given the volume and variety of forms involved in the guardianship process. However, because the guardianship process has not been integrated into a single, efficient system, conventional guardianship systems cannot enjoy the advantages of an integrated information system.

SUMMARY OF THE INVENTION

A method for processing a legal guardianship in a computer communications network can include first capturing guardianship data from at least one guardianship form. In particular, the guardianship data can include ward data and guardian data. Once captured, the ward data and guardian data can be transmitted over the computer communications network to a guardian background investigator. The background investigator can conduct a background investigation based on the guardian data. Subsequently, the background investigation can produce background investigation data.

The background investigation data can be electronically received from the guardian background investigator; and, a guardianship plan for managing assets associated with a ward described by the ward data can be captured. The ward data, guardian data, background investigation data, and guardianship plan can be combined in a guardianship file; and, the guardianship file can be stored in a fixed storage in the computer communications network. Notably, the guardianship plan can be accessed by an authorized client computer communicatively linked to the computer communications network. Finally, audit data relating to the ward data, guardian data and guardianship plan can be captured and added to the guardianship file.

In accordance with a system aspect of the present invention, an integrated guardianship system can include a Clerk of the Court system for processing ward data and guardianship data; a guardian background investigation system communicatively linked to the Clerk of the Court system over a computer communications network; and, at least one database for storing ward, guardianship and background data, wherein the ward, guardianship and background data can be accessed by an authorized system communicatively linked to the computer communications network.

Notably, the guardian background investigation system can conduct background investigations of guardians based on guardian data electronically provided by the Clerk of the Court system over the computer communications network. The background investigations, in turn, can produce guardian background data. Finally, the guardian background investigation system can electronically provide the guardian background data to the Clerk of the Court system over the computer communications network.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a system, method and machine readable storage which individually and in combination permit the capture and processing of data from conventional guardianship forms. In particular, the system can support the capture of data relating to the initial inventory of a ward's assets, the plans for the use of the ward's assets to sustain a consistent standard of living, and the annual accountings which establish that the ward's assets were used in an appropriate manner as proscribed by law.

Figure 1:
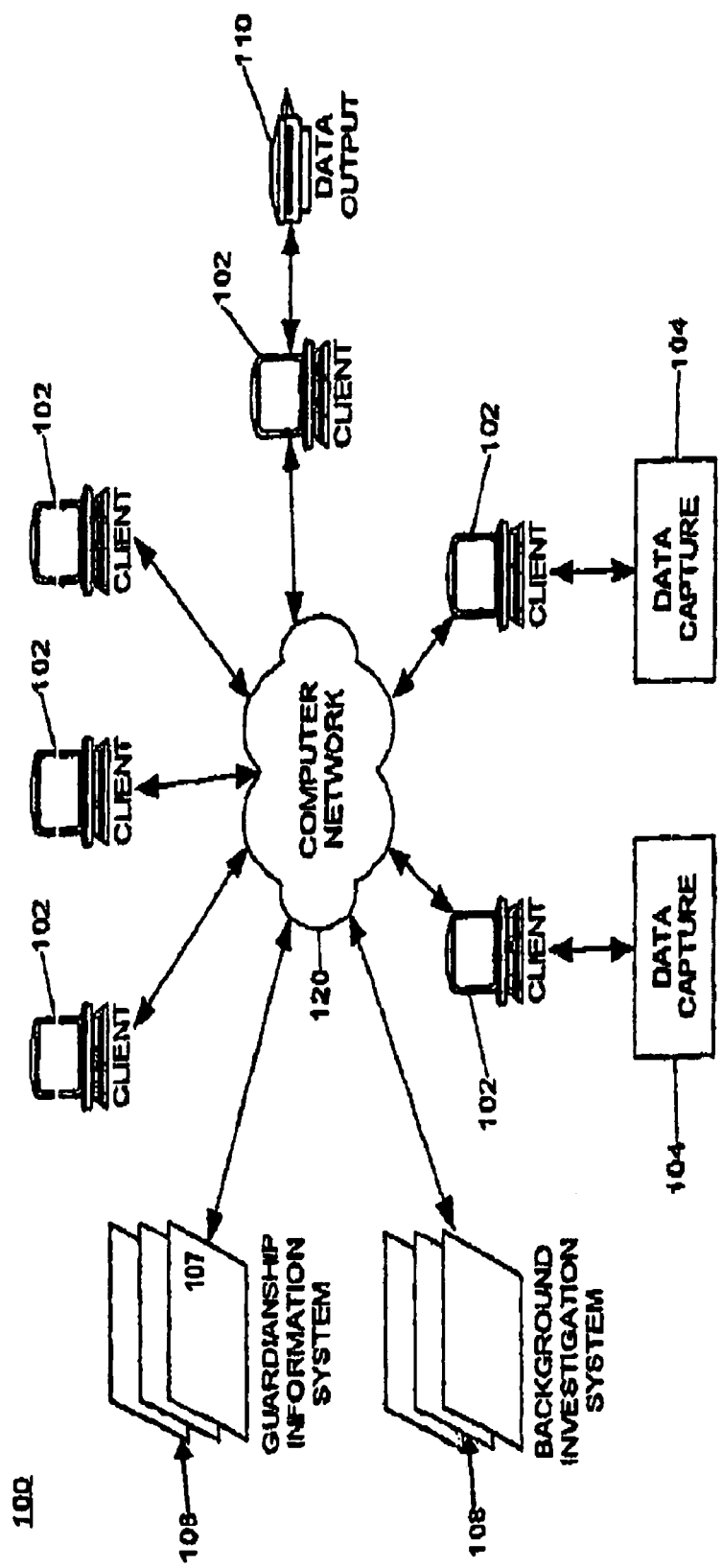
FIG. 1 is a pictorial representation of a guardianship information system configured in accordance with the inventive arrangements.

FIG. 1 is a pictorial representation of a guardianship data capture and processing flog system (system) 100 which has been configured in accordance with a preferred albeit not exclusive aspect of the present invention. The system 100 can include a computer network 120. For example, the computer network can be a private network, such as a LAN or WAN, or a public network, such as the Internet. The system 100 also can include clients 102 communicating with other computing devices via the computer network 120.

The clients 102 can be computer terminals, personal computers, workstations, laptop computers, hand held computers, or any other device or system that can send and/or receive data. The clients 102 can incorporate network communication devices for communicating with the computer network 120, for example network cards or a modems.

Further, data capture devices 104, such as keyboards, scanners, data storage readers, or any other devices that can be used to enter data into a computer, can be connected to or incorporated within clients 102. For example, a data capture device can be a scanner that scans text, which is then sent to an optical character recognition (OCR) program operating on the client 102 for data conversion. Clients 102 also can incorporate data output devices 110. A data output device 110 can be, for example, a printer, a display, an audio system, a data recorder, etc.

The system 100 also can incorporate a guardianship information system 106 for receiving, processing, and storing guardian and ward data. In particular, in one aspect of the invention, the guardianship information system can be an Internet application driven by back-end databases and having a front-end Web interface. The front-end Web interface can interact with the back-end databases through the use of conventional database query statements such as those statements conforming to structured query language. Illustratively, the guardianship information system 106 includes a guardianship form 107.

Data produced by a system configured according to this aspect of the present invention can be provided in any conventional format, for example the portable document format. The guardianship information system 106 can operate on a computer incorporating a processor and an operating system, for example a mainframe computer, a network server, a file server, or any other digital computing device incorporating data storage. The computer hosting the guardianship information system also can incorporate a data storage medium, for example an electronic storage medium, a magnetic storage medium, an optical storage medium, a magneto-optical storage medium.

A background investigation system 108 can be provided as well. Significantly, the background investigation system 108 can store data relevant to the background search for a case. As with the guardianship information system, the background investigation system 108 can be an Internet application driven by back-end databases and having a front-end Web interface and can operate on a computer having a storage medium. In one embodiment, the background investigation system 108 and the guardianship information system 106 can operate on the same computing device and share common software components.

Figure 2:
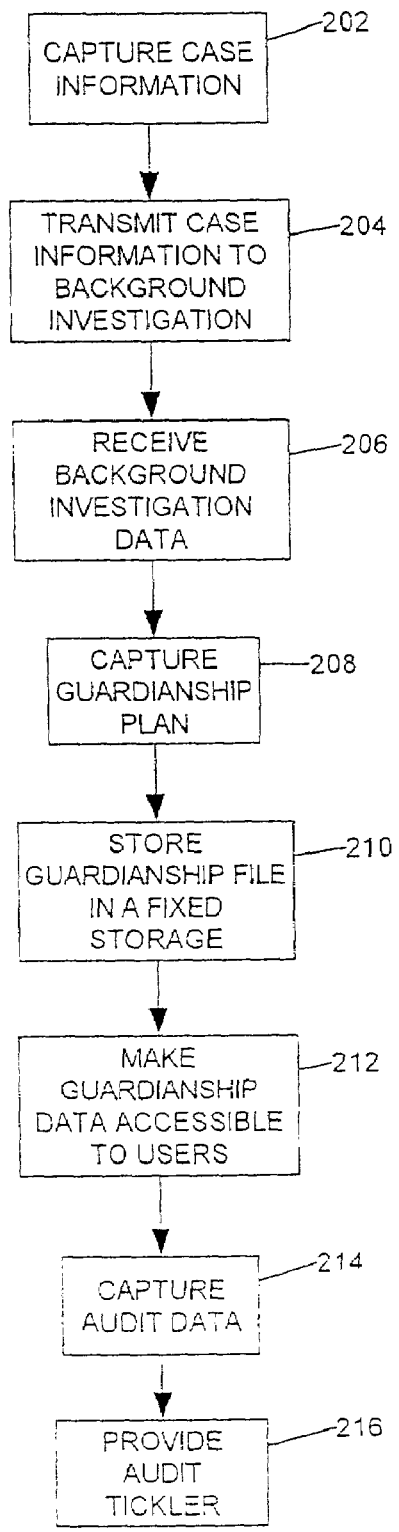
FIG. 2 is a schematic representation of a guardianship information system configured in accordance with the inventive arrangements.

The present invention also can include a method for capturing and processing data in a guardianship information system, as shown in the flowchart 200 of FIG. 2. Importantly, a system configured in accordance with the inventive arrangements can provide a mechanism for electronically preparing a guardianship from initial file creation, through background investigation and plan, through audit. Specifically, in one exemplary aspect of the present invention in which a Clerk of the Court and Court Monitor collectively provide guardianship case management services, initial case information can be collected in relation to a ward, a corresponding guardian, and one or more attorneys.

Referring to step 202, the method can include collecting case data about a ward, guardian, trust accounts, etc. The case data can be keyed into the system directly from pre-printed forms. Alternatively, the case information can be optically captured from a form using conventional OCR technology. For example, a form containing information about a ward or guardian can be captured by a data capture device 104, such as a scanner connected to a client 102. The case information also can be keyed into a client 102 by the Clerk of the Court. Notably, where signatures are required to be affixed to completed forms, the signatures can be captured using a handwriting input device and digitally affixed to a digital representation of the form. Alternatively, forms can include digital signatures electronically produced using conventional digital signature technology.

Once entered, the case data can be forwarded to other components of the system 100 via the computer network 120. For example, the case data can be forwarded to the background investigation system 108, as shown in step 204. A background investigator then can access the background investigation system 108 and commence a background investigation relevant to the case. The data also can be electronically transmitted to the guardianship information system 106 so that an electronic guardianship file can be generated. If a guardianship file already exists for the case the data pertains to, then the data can be added to that guardianship file. In one arrangement, the guardianship file can include a plurality of completed guardianship forms as well as other data related to the case, such as ward and guardian data.

Upon receipt of the data by the background investigation system, a background check can be automatically triggered and performed. Notably, the background check can be conducted electronically, for instance utilizing services in a publically accessible network such as the Internet, or manually. Still, the invention is not limited in regard to the method in which a background check can be conducted and any combination of electronic and manual background checks can suffice. Significantly, in one arrangement the background investigation system 108 can perform data analysis on background data. Reports of the data analysis can be provided to the background investigator.

In yet another arrangement the background investigation system can monitor updates to the guardianship file for evaluation during and after the formal background investigation. Subsequently, the results and/or status of the background investigation can be electronically transmitted to the guardianship information system 106 for entry into the guardianship file. The results of the background check also can be me electronically communicated to the client 102 operated by the Clerk of the Court. Specifically, as in the case of conventional guardianship, probate and mental health plans, the plan in the present invention can provide guidelines for how the resources of the ward are to be utilized in order to provide a particular standard of living for the ward.

Referring to step 208, using the results from the background investigation as well as other data contained in the guardianship file, a guardianship plan for managing assets and performing other guardian duties can be created and captured to the guardianship file. At step 210, the guardianship file can be stored in a fixed storage. The guardianship file data then can be made accessible to authorized users, as shown in step 212.

Significantly, a system in accordance with the inventive arrangements can further provide to authorized users on clients 102 three outputs of data from the guardianship file. First, a digital image of a completed guardianship form can be produced which lacks only a signature. Second, a digital image of a completed guardianship form having a signature can be produced. Finally, a digital data stream containing raw guardianship data provided in the completed guardianship form can be produced.

Referring to step 214, audit data can be generated for a guardianship case and captured into the guardianship file to facilitate review of the audit. The audit data can be provided to an authorized user upon request. The audit can be used to review transactions related to ward assets and other matters pertaining to the ward to ensure that the ward's resources are utilized in a manner consonant with the plan. Referring to step 216 an auditing tickler can be provided to automatically trigger an audit upon a pre-defined instance or according to a preset schedule. For example, an audit can be triggered upon a large asset transaction, when a guardian moves out of state, or at periodic intervals. The audits also can be triggered algorithmically or manually at the behest of an auditor. In addition, the audit can be used by a victim advocate to ensure the proper management of the ward.

Figure 3:
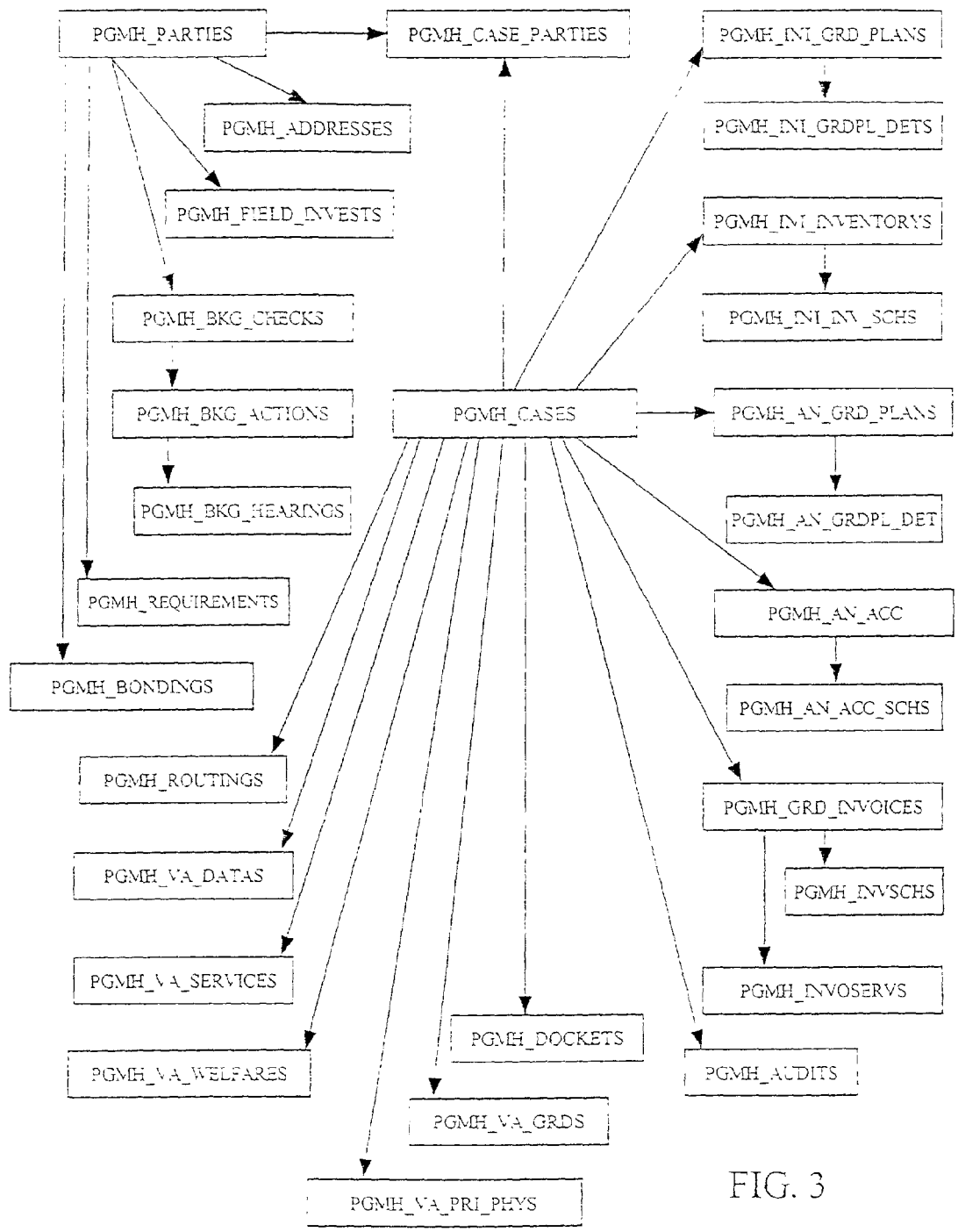
FIG. 3 is a flow chart representing the method of capturing and storing guardianship and audit data in accordance with the inventive arrangements.

The present invention can be implemented as a network enabled and distributed application. For example, program objects, such as database table objects, can be incorporated into the guardianship information system 106 and/or the background investigation system 108. FIG. 3 illustrates the relationship between various program objects in an exemplary database incorporated within the system 100. Specifically, the table PGMH_PARTIES can have fields common to other tables. Those fields can be used to link the PGMH_PARTIES table to the other tables. For example, the PGMH_PARTIES table can be linked to PGMH_CASE_PARTIES, PGMH_ADDRESSES, PGMH_FIELD_INVESTS, PGMH_BKG_CHECKS, PGMH_REQUIREMENTS, and PGMH_BONDINGS. Notably, some of these tables can further be linked to other tables. For example, PGMH_BKG_CHECKS can be linked to PGMH_BKG_ACTIONS and PGMH_BKG_HEARINGS. Significantly, some tables can be linked to more than one other table. For example, PGMH_CASE_PARTIES is linked to both PGMH_PARTIES and PGMH_CASES.

Referring to Appendix A, exemplary code for creating and managing a database in accordance with the inventive arrangements is provided. Similarly, Appendix B includes screen shots illustrating an exemplary Web interface for an Internet application configured in accordance with the inventive arrangements.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. A method for processing a legal guardianship in a computer communications network comprising:

capturing guardianship data from at least one guardianship form, said guardianship data comprising ward data and guardian data;

electronically transmitting said ward data and guardian data over the computer communications network to a guardian background investigator, said background investigator conducting a background investigation based on said guardian data, said background investigation producing background investigation data;

electronically receiving over the computer communications network said background investigation data from said guardian background investigator;

electronically processing said ward data, guardian data, and background investigation data to create a guardianship plan in a guardianship file; and, storing said guardianship file in a fixed storage in the computer communications network which can be accessed by a client computer communicatively linked to the computer communications network when said client computer is authorized to access said guardianship file.

2. The method of claim 1, further comprising:

third capturing audit data relating to said ward data, guardian data and guardianship plan; and, adding said audit data to said guardianship file.

3. The method of claim 2, further comprising providing an audit tickler to automatically trigger an audit in response to at least one of detecting a pre-determined pattern within said audit data and a predetermined schedule.

4. The method of claim 1, further comprising updating said guardianship file for evaluation during and after background investigation.

5. The method of claim 1, further comprising:

electronically transmitting said ward data and guardian data over the computer communications network to a background investigation system;

performing electronic data analysis on said ward and guardian data with said background investigation system; and electronically transmitting reports of said electronic data analysis to said guardian background investigator.

6. The method of claim 5, further comprising:
electronically transmitting said ward data and guardian data over the computer communications network to a background investigation system;
said background investigation system monitoring updates to the guardianship file for evaluation during and after a formal background investigation; and
electronically transmitting results from said monitoring to said guardianship file.

7. The method of claim 5, further comprising electronically transmitting said data analysis to a Clerk of the Court.

8. An integrated guardianship system comprising:
a guardianship information system provided by a Clerk of the Court for processing ward data and guardianship data;
a guardian background investigation system communicatively linked to said guardianship information system over a computer communications network, said guardian background investigation system conducting background investigations of guardians based on guardian data electronically provided by said Clerk of the Court via said guardianship information system over said computer communications network, said background investigations producing guardian background data, said guardian background investigation system electronically providing said guardian background data to said Clerk of the Court via said guardianship information system over said computer communications network; and,
at least one database for storing said ward, guardianship and background data, wherein said ward, guardianship and background data can be accessed by an authorized system communicatively linked to said computer communications network.

9. A system for processing a legal guardianship in a computer communications network, comprising:
a data capture device for capturing guardianship data from at least one guardianship form, said guardianship data comprising ward data and guardian data;
a transmitting device for electronically transmitting said ward data and guardian data over the computer communications network to a guardian background investigator, said background investigator conducting a background investigation based on said guardian data, said background investigation producing background investigation data;
a receiving device for electronically receiving over the computer communications network said background investigation data from said guardian background investigator;
a guardianship information system for electronically obtaining said guardianship data from said data capture device and for electronically obtaining said background investigation data from said receiving device, said guardianship information system processing said guardianship data and said background investigation data to create a guardianship plan; and
a data storage device for storing said ward data, guardian data, background investigation data, and said guardianship plan in a guardianship file;
wherein said guardianship file is accessed from said data storage by an authorized client computer communicatively linked to the computer communications network.

10. The system of claim 9, further comprising an audit system comprising an audit data generator configured to generate audit data based upon said guardianship file, and an audit tickler configured to automatically trigger an audit upon detecting a pattern within said audit data.

11. The system of claim 9, further comprising an audit system comprising an audit data generator configured to generate audit data based upon said guardianship file, and an audit tickler configured to automatically trigger an audit at predetermined intervals.

12. A machine readable storage, having stored thereon a computer program for processing a legal guardianship in a computer communications network, said computer program having a plurality of code sections executable by a machine for causing the machine to perform the steps of:
capturing guardianship data from at least one guardianship form, said guardianship data comprising ward data and guardian data;
electronically transmitting said ward data and guardian data over the computer communications network to a guardian background investigator, said background investigator conducting a background investigation based on said guardian data, said background investigation producing background investigation data;
electronically receiving over the computer communications network said background investigation data from said guardian background investigator;
electronically processing said ward data, guardian data, and background investigation data to create a guardianship plan in a guardianship file; and,
storing said guardianship file in a fixed storage in the computer communications network which can be accessed by a client computer communicatively linked to the computer communications network when said client computer is authorized to access said guardianship file.

13. The machine readable storage of claim 12, further comprising the steps of:
third capturing audit data relating to said ward data, guardian data and guardianship plan; and,
adding said audit data to said guardianship file.

14. The machine readable storage of claim 13, further comprising the step of providing auditing tickler to automatically trigger an audit in response to at least one of detecting a pre-determined pattern within said audit data and predetermined schedule.

15. The machine readable storage of claim 12, further comprising updating said guardianship file for evaluation during and after said background investigation.

16. The machine readable storage of claim 12, further comprising the steps of:
electronically transmitting said ward data and guardian data over the computer communications network to a background investigation system;
performing electronic data analysis on said ward and guardian data with said background investigation system; and
electronically transmitting reports of said electronic data analysis to said guardian background investigator.

17. The machine readable storage of claim 16, further comprising the steps of:
electronically transmitting said ward data and guardian data over the computer communications network to a background investigation system;
said background investigation system monitoring updates to the guardianship file for evaluation during and after a formal background investigation; and
electronically transmitting results from said monitoring to said guardianship file.

18. The machine readable storage of claim 16, further comprising the step of electronically transmitting said results to a Clerk of the Court.

* * * * *